United States Patent
Jin et al.

(10) Patent No.: US 11,566,622 B2
(45) Date of Patent: Jan. 31, 2023

(54) COUNTERWEIGHT FOR COMPRESSOR, MOTOR FOR COMPRESSOR AND COMPRESSOR

(71) Applicant: Danfoss (Tianjin) Ltd., Tianjin (CN)

(72) Inventors: Jian Jin, Tianjin (CN); Xing Zheng, Tianjin (CN); Jing Zhao, Tianjin (CN); Yanbo Zhao, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 175 days.

(21) Appl. No.: 16/935,519

(22) Filed: Jul. 22, 2020

(65) Prior Publication Data

US 2021/0025394 A1 Jan. 28, 2021

(30) Foreign Application Priority Data

Jul. 24, 2019 (CN) .......................... 201921173818.8

(51) Int. Cl.
| | |
|---|---|
| F04C 29/00 | (2006.01) |
| H02K 7/14 | (2006.01) |
| F16F 15/34 | (2006.01) |
| F04C 18/02 | (2006.01) |
| H02K 7/04 | (2006.01) |

(52) U.S. Cl.
CPC ...... *F04C 29/0021* (2013.01); *F04C 18/0215* (2013.01); *F16F 15/34* (2013.01); *H02K 7/04* (2013.01); *H02K 7/14* (2013.01); *F04C 2240/40* (2013.01); *F04C 2240/807* (2013.01)

(58) Field of Classification Search
CPC .............. F04C 18/0215; F04C 29/0021; F04C 2240/40; F04C 2440/807; H02K 7/14; F16F 15/314; F16F 15/315; F16F 15/34
See application file for complete search history.

(56) References Cited

U.S. PATENT DOCUMENTS

| | | | | |
|---|---|---|---|---|
| 5,495,885 A | * | 3/1996 | Fowlkes ................... | H02K 7/04 |
| | | | | 164/112 |
| 6,517,328 B2 | | 2/2003 | Makino et al. | |

(Continued)

FOREIGN PATENT DOCUMENTS

| | | |
|---|---|---|
| CN | 201152262 Y | 11/2008 |
| CN | 205135944 U | 4/2016 |

(Continued)

OTHER PUBLICATIONS

Evans, Paul "Density of Metals," theengineeringmindset.com/density-of-metals/ (Year: 2022).*

(Continued)

*Primary Examiner* — Charles G Freay

(74) *Attorney, Agent, or Firm* — McCormick, Paulding & Huber PLLC

(57) ABSTRACT

The present invention provides a counterweight for a compressor, an electric motor, with the counterweight, for a compressor, and a compressor with the electric motor or the counterweight. The counterweight comprises: a first component having an annular shape; a first groove formed in a surface of the first component and having a sidewall and a bottom wall; and a second component disposed in the first groove. With the technical solution according to the present invention, for example, counterbalance requirements are met, while fluid can be prevented from being stirred to cause power loss.

18 Claims, 4 Drawing Sheets

(56) References Cited

U.S. PATENT DOCUMENTS

| | | | | |
|---|---|---|---|---|
| 7,934,914 B2* | 5/2011 | Reinhart | ............ | F04C 18/0215 |
| | | | | 418/55.1 |
| 2014/0044574 A1* | 2/2014 | Iitsuka | ................. | F04C 23/008 |
| | | | | 417/410.5 |
| 2018/0258935 A1 | 9/2018 | Tsukahara et al. | | |

FOREIGN PATENT DOCUMENTS

| | | | |
|---|---|---|---|
| CN | 205141899 U | | 4/2016 |
| CN | 206221265 U | | 6/2017 |
| DE | 10 2009 047619 | * | 6/2011 |

OTHER PUBLICATIONS

First Examination Report for Indian Patent Application No. 202014027822 dated Aug. 2, 2021.

* cited by examiner

COUNTERWEIGHT FOR COMPRESSOR, MOTOR FOR COMPRESSOR AND COMPRESSOR

CROSS-REFERENCE TO RELATED APPLICATION

This application claims foreign priority benefits under 35 U.S.C. § 119 to Chinese Patent Application No. 201921173818.8 filed on Jul. 24, 2019, the content of which is hereby incorporated by reference in its entirety.

BACKGROUND OF THE DISCLOSURE

Technical Field

The present invention relates to a counterweight for a compressor, a motor (i.e., an electric motor) for a compressor and a compressor.

Background

An existing counterweight of a compressor is usually assembled on a crankshaft (a rotor of an electric motor). The counterweight is composed of a same material and generally has a non-closed semicircular shape. When the crankshaft rotates, the counterweight rotates with the crankshaft. The counterweight tends to agitate a fluid in a sump of the compressor. In this case, on the one hand, the power consumption of the compressor will be increased, thereby degrading the performance of the compressor, and on the other hand, it is also possible to increase the dissolution of oil and refrigerant, which will cause more oil to be discharged from a compressor refrigeration system, thereby reducing the performance of the system.

SUMMARY

The object of the present invention is to provide a counterweight for a compressor, an electric motor with the counterweight for a compressor, and a compressor with the electric motor or the counterweight, for example, such that not only a counterbalance is realized, but a fluid can also pass the counterweight smoothly without being stirred up, thereby eliminating the power loss of the counterweight.

In accordance with an aspect of the present invention, there is provided a counterweight for a compressor. The counterweight comprises: a first component having an annular shape; a first groove formed in a surface of the first component and having a sidewall and a bottom wall; and a second component disposed in the first groove.

In accordance with the aspect of the present invention, the first component is formed of a first material, the second component is formed of a second material, and the first material has a less density than the second material.

In accordance with the aspect of the present invention, the first component is integral or unitary.

In accordance with the aspect of the present invention, the counterweight further comprises: a second groove formed in the surface of the first component, having a sidewall and a bottom wall, and separated from the first groove in a circumferential direction of the first component.

In accordance with the aspect of the present invention, the first groove and the second groove constitute a plurality of grooves which are the same and which are arranged at equal intervals in the circumferential direction of the first component.

In accordance with the aspect of the present invention, the counterweight comprises a single first groove and a plurality of second grooves, and the plurality of second grooves are arranged in the circumferential direction of the first component.

In accordance with the aspect of the present invention, the plurality of second grooves are the same and are arranged at equal intervals in the circumferential direction of the first component.

In accordance with the aspect of the present invention, the counterweight comprises a plurality of first grooves which are the same and are arranged at equal intervals in the circumferential direction of the first component.

In accordance with the aspect of the present invention, the second component has a same shape as the first groove and a surface of the second component facing away from the bottom wall of the first groove and the surface of the first component are in a same plane.

In accordance with another aspect of the present invention, there is provided an electric motor for a compressor. The electric motor comprises: a rotor having an end surface; and the above counterweight which is connected to the end surface of the rotor.

In accordance with still another aspect of the present invention, there is provided a compressor. The compressor comprises: the above counterweight or the above electric motor.

With the counterweight, the electric motor and the compressor according to the present invention, different counterbalances can be realized by adjusting the density and the volume of the material having the greater density in the counterweight, and counterbalance requirements are met, while the fluid can pass the counterweight smoothly without being stirred up, thereby eliminating the power loss of the counterweight. In addition, the first component of the counterweight according to the present invention is integrally formed, and then is preset into an injection mold to form a groove, and an injection molding is started to form the second component. Therefore, the counterweight itself is simple in connection without needing a fastening part such as a bolt. The counterweight has few parts and is easy to assemble.

DETAILED DESCRIPTION

A further description of the present invention will be made as below with reference to embodiments of the present invention taken in conjunction with the accompanying drawings.

For example, a compressor according to an embodiment of the present invention may be any compressor which needs a counterweight, such as a scroll compressor. The compressor comprises: a shell; an orbiting scroll disposed in the shell; a fixed scroll disposed in the shell; a housing for supporting the fixed scroll; and an electric motor. The electric motor is disposed under the housing and comprises a rotor, a stator, and a drive shaft extending through and connected to the rotor. The drive shaft is connected to the orbiting scroll.

Figure 1:
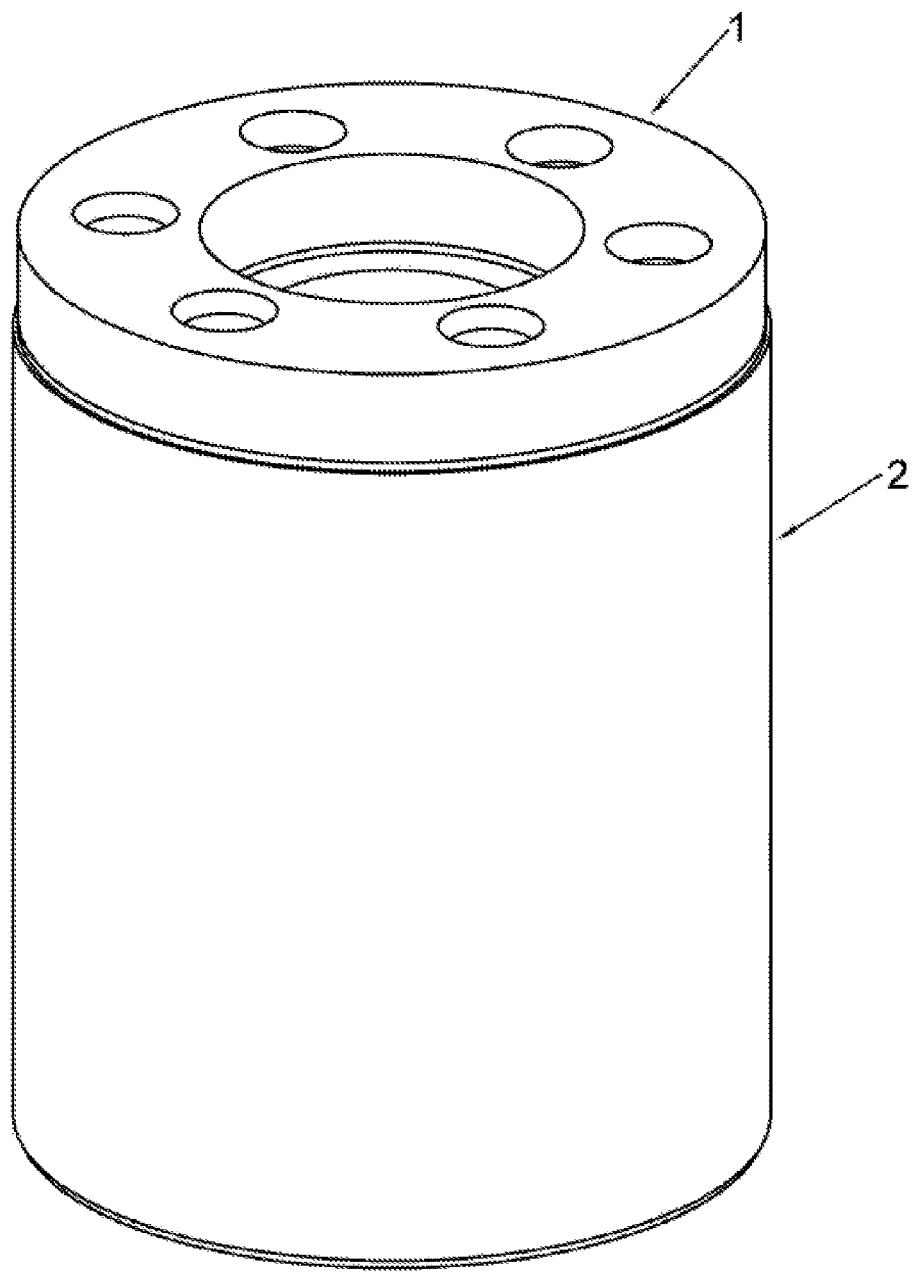
FIG. 1 is a schematic perspective view of a rotor of an electric motor and a counterweight for a compressor according to an embodiment of the present invention.
Figure 2:
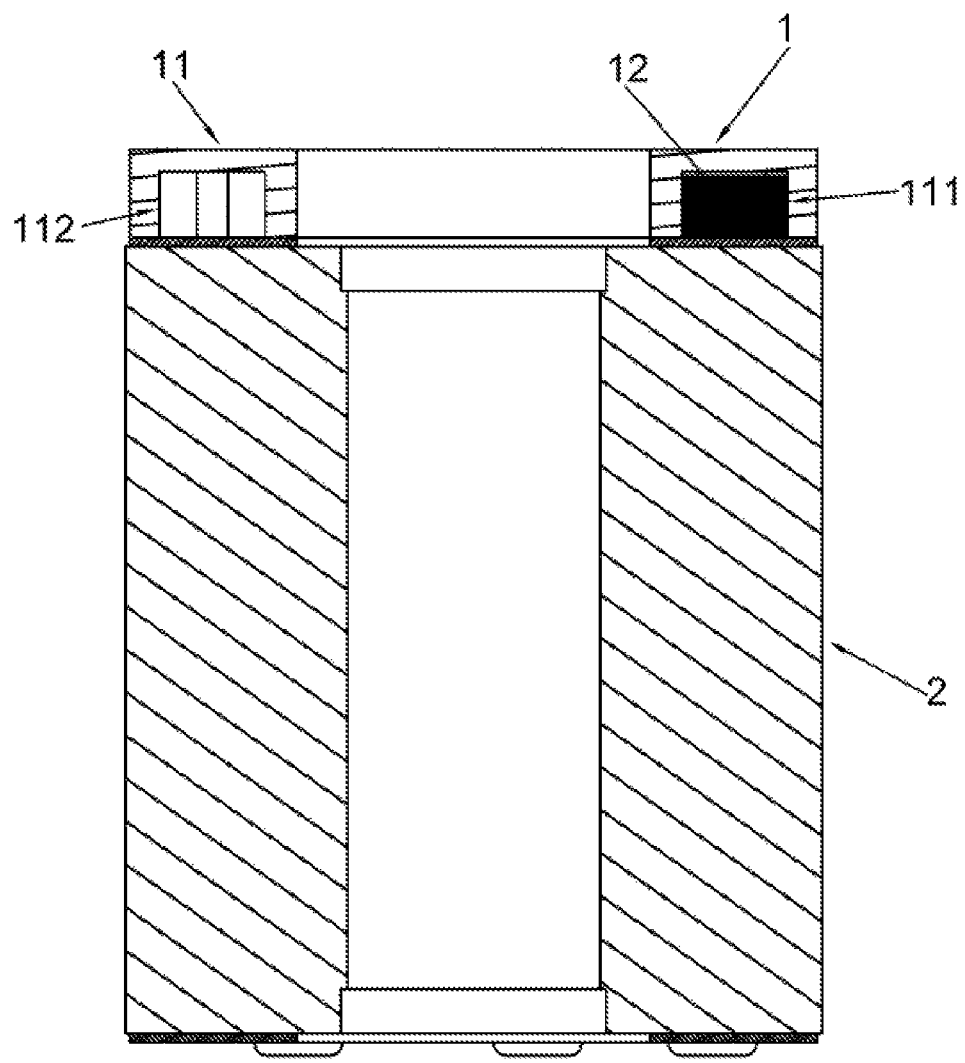
FIG. 2 is a schematic sectional view of the rotor and the counterweight shown in FIG. 1.

As shown in FIGS. 1 to 2, according to an embodiment of the present invention, a counterweight 1 is connected to an end surface of the rotor 2 to rotate with the rotor 2. Alternatively, the counterweight 1 may be connected to the drive shaft to rotate with the drive shaft.

Referring to FIGS. 1 to 4, the counterweight 1 for the compressor according to an embodiment of the present invention comprises: a first component 11 having an annular shape; a first groove 111 which is formed in an upper surface 110 of the first component 11, for example on a side of the annular first component 11 in an axial direction of the annular first component 11, and which has a sidewall 1112 and a bottom wall 1113; and a second component 12 disposed in the first groove 111. The upper surface 110 of the first component 11 is, for example, a surface of the first component 11 attached to the end surface of the rotor 2. The first component 11 is formed of a first material, the second component 12 is formed of a second material, and the first material has a less density than the second material. Alternatively, the density of the first material may be equal to the density of the second material. The first component 11 may be integral. For example, the integral first component 11 is formed of plastic by injection molding. In a section perpendicular to the axial direction of the first component 11, the second component 12 may have a same shape as the first groove 111. In the section perpendicular to the axial direction of the first component 11, the first groove 111 may be located on a side of a straight line passing through a center of the first component 11. A surface of the second component 12 facing away from the bottom wall 1113 of the first groove 111 and the upper surface 110 of the first component 11 may be located in a same plane.

Figure 3:
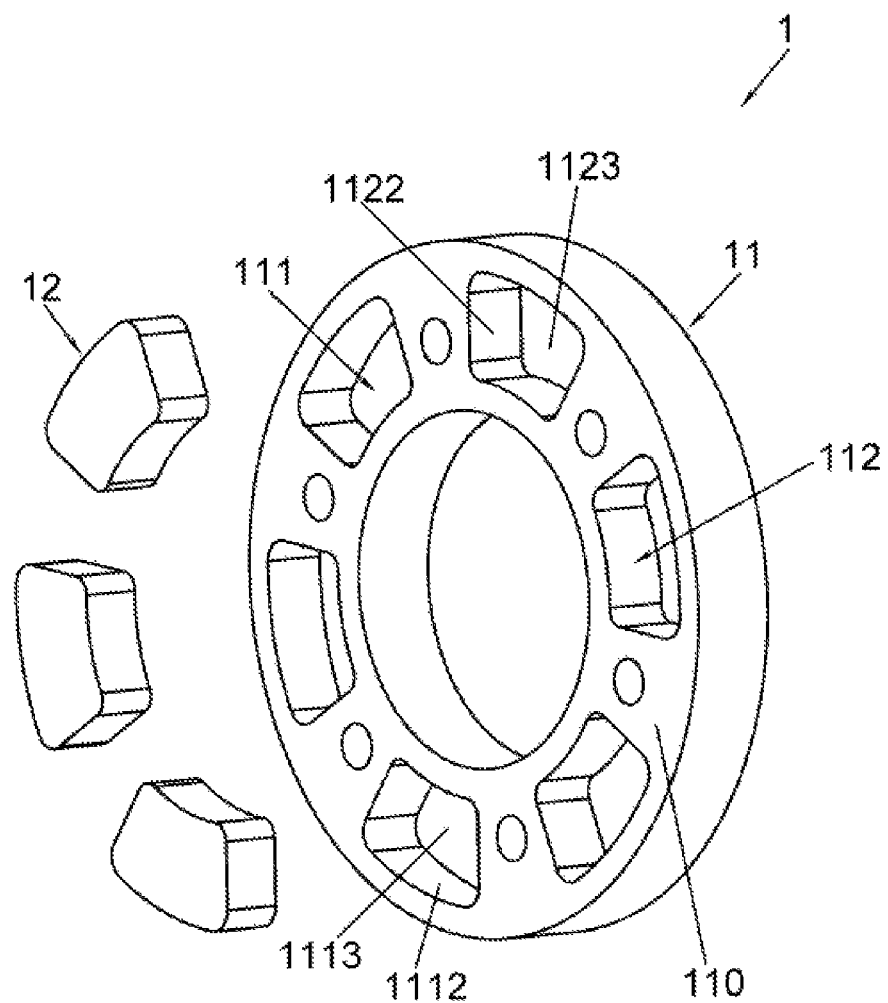
FIG. 3 is a schematic exploded perspective view of a counterweight for a compressor according to an embodiment of the present invention.
Figure 4:
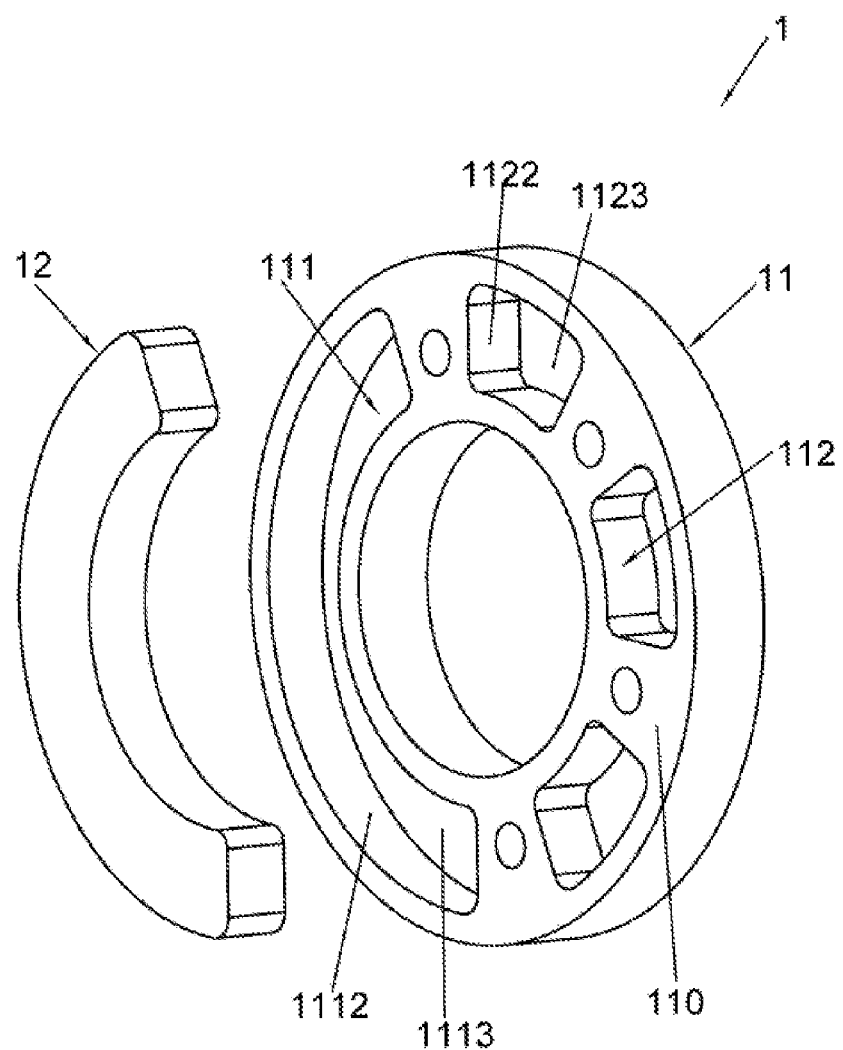
FIG. 4 is a schematic exploded perspective view of a counterweight for a compressor according to another embodiment of the present invention.

Referring to FIGS. 3 and 4, according to embodiments of the present invention, the counterweight 1 further comprises: a second groove 112. The second groove 112 is also formed in the upper surface 110 of the first component 11, has a sidewall 1122 and a bottom wall 1123, and is separated from the first groove 111 in a circumferential direction of the first component 11. According to examples of the present invention, the second component 12 may also be disposed in the second groove 112, or the second groove 112 may be filled with a material. A density of the material is different from a density of a material of the second component 12 and is greater than a density of a material of the first component 11. Alternatively, the second component 12 is not disposed in the second groove 112, or the second groove 112 is filled with no material, and the second groove 112 is maintained in an empty state. In other words, the first groove 111 and the second groove 112 may be selectively filled with the same material or different materials according to requirements to realize a required counterbalance. In the embodiment shown in FIG. 4, in an annular section perpendicular to the axial direction of the first component 11, the first groove 111 is located on a side of the annular section, and the second groove 112 is located on the other side of the annular section. Of course, in other embodiments, the first groove 111 and the second groove 112 may also be located on the same side of the annular section.

Referring to FIGS. 3 and 4, according to embodiments of the present invention, a size of the first groove 111 in a radial direction of the first component 11 may be equal to a size of the second groove 112 in the radial direction of the first component 11. Referring to FIG. 4, a size of the first groove 111 in the circumferential direction of the first component 11 may be greater than a size of the second groove 112 in the circumferential direction of the first component 11.

Referring to FIG. 3, according to embodiments of the present invention, the first groove 111 and the second groove 112 constitute a plurality of grooves which are the same, for example which are identical in size and shape, and which are arranged at equal intervals in the circumferential direction of the first component 11. In other words, the plurality of grooves are constituted by a plurality of first grooves 111 and a plurality of second grooves 112 which are the same and which are arranged at equal intervals in the circumferential direction of the first component 11. In an embodiment, the plurality of grooves may be the same six grooves. In this case, the counterweight 1 comprises three first grooves 111 and three second grooves 112 which are arranged at equal intervals in the circumferential direction of the first component 11.

Referring to FIG. 4, according to embodiments of the present invention, the counterweight 1 comprises a single first groove 111 and a plurality of second grooves 112, and the plurality of second grooves 112 are arranged in the circumferential direction of the first component 11. For example, the plurality of second grooves 112 are the same and are arranged at equal intervals in the circumferential direction of the first component 11. In an embodiment, the plurality of second grooves 112 may be the same three second grooves 112.

As described above, in FIG. 3, according to embodiments of the present invention, the counterweight 1 comprises a plurality of first grooves 111 which are the same and are arranged at equal intervals in the circumferential direction of the first component 11. In FIG. 4, according to embodiments of the present invention, the counterweight 1 comprises a single first groove 111.

Referring to FIGS. 3 and 4, according to embodiments of the present invention, the counterweight 1 further comprises: a connection hole 3 for connecting the counterweight 1 to, for example, the end surface of the rotor 2.

With the counterweight 1 according to the embodiments of the present invention, not only a counterbalance is realized, but a fluid can also pass the counterweight smoothly without being stirred up, thereby eliminating the power loss of the counterweight.

The counterweight 1 according to the embodiments of the present invention has an adjustable mass distribution, and a constant sectional area in a direction of rotation or the circumferential direction, so that fluid can be prevented from being stirred to cause power consumption. In addition, since the second component 12 with which the groove is filled has a greater density than a body (i.e. the first component 11) of the counterweight 1, different counterbalances can be very easily realized by adjusting the volume and the density of the second component 12, for example by selectively filling the plurality of grooves with the second components 12 according to requirements.

With the counterweight 1 according to the embodiments of the present invention, the second component 12 is preset into an injection mold after being formed, and then an injection molding is started to form the counterweight 1; or the first component 11 and the second component 12 are formed separately, and then are connected to each other by a hot riveting technology.

With the counterweight 1 according to the embodiments of the present invention, the second component 12 can be simply connected to the first component 11 without needing a fastening part such as a bolt. The counterweight has few parts and is easy to assemble. In addition, in the case where the counterweight 1 is fixed to the rotor of the electric motor, it is not necessary to form a connection groove in the crankshaft so that the crankshaft is unchanged in strength.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A counterweight for a compressor, the counterweight comprising:
    a first component having an annular shape;
    a first groove formed in a surface of the first component and having a sidewall and a bottom wall;
    a second groove formed in the surface of the first component, having a sidewall and a bottom wall, and separated from the first groove in a circumferential direction of the first component; and
    a second component disposed in the first groove.

2. The counterweight of claim 1, wherein:
    the first component is formed of a first material, the second component is formed of a second material, and the first material has a less density than the second material.

3. The electric motor for a compressor, the electric motor comprising:
    a rotor having an end surface; and
    the counterweight of claim 2, which is connected to the end surface of the rotor.

4. The counterweight of claim 1, wherein:
    the first component is integral or unitary.

5. The electric motor for a compressor, the electric motor comprising:
    a rotor having an end surface; and
    the counterweight of claim 4, which is connected to the end surface of the rotor.

6. The counterweight of claim 1, wherein:
    the first groove and the second groove constitute a plurality of grooves which are the same and which are arranged at equal intervals in the circumferential direction of the first component.

7. The electric motor for a compressor, the electric motor comprising:
    a rotor having an end surface; and
    the counterweight of claim 6, which is connected to the end surface of the rotor.

8. The counterweight of claim 1, wherein:
    the counterweight comprises a single first groove and a plurality of second grooves, and the plurality of second grooves are arranged in the circumferential direction of the first component.

9. The counterweight of claim 8, wherein:
    the plurality of second grooves are the same and are arranged at equal intervals in the circumferential direction of the first component.

10. The electric motor for a compressor, the electric motor comprising:
    a rotor having an end surface; and
    the counterweight of claim 8, which is connected to the end surface of the rotor.

11. The electric motor for a compressor, the electric motor comprising:
    a rotor having an end surface; and
    the counterweight of claim 9, which is connected to the end surface of the rotor.

12. The counterweight of claim 1, wherein:
    the counterweight comprises a plurality of first grooves which are the same and are arranged at equal intervals in the circumferential direction of the first component.

13. The electric motor for a compressor, the electric motor comprising:
    a rotor having an end surface; and
    the counterweight of claim 12, which is connected to the end surface of the rotor.

14. The counterweight of claim 1, wherein:
    the second component has a same shape as the first groove and a surface of the second component facing away from the bottom wall of the first groove and the surface of the first component are in a same plane.

15. The electric motor for a compressor, the electric motor comprising:
    a rotor having an end surface; and
    the counterweight of claim 14, which is connected to the end surface of the rotor.

16. An electric motor for a compressor, the electric motor comprising:
    a rotor having an end surface; and
    the counterweight of claim 1, which is connected to the end surface of the rotor.

17. A compressor comprising:
    The electric motor of claim 16.

18. A compressor comprising:
    the counterweight of claim 1.

* * * * *